Nov. 15, 1960
A. D. HOLT
2,960,213
VIBRATING CONVEYOR
Filed Aug. 22, 1956
4 Sheets-Sheet 3
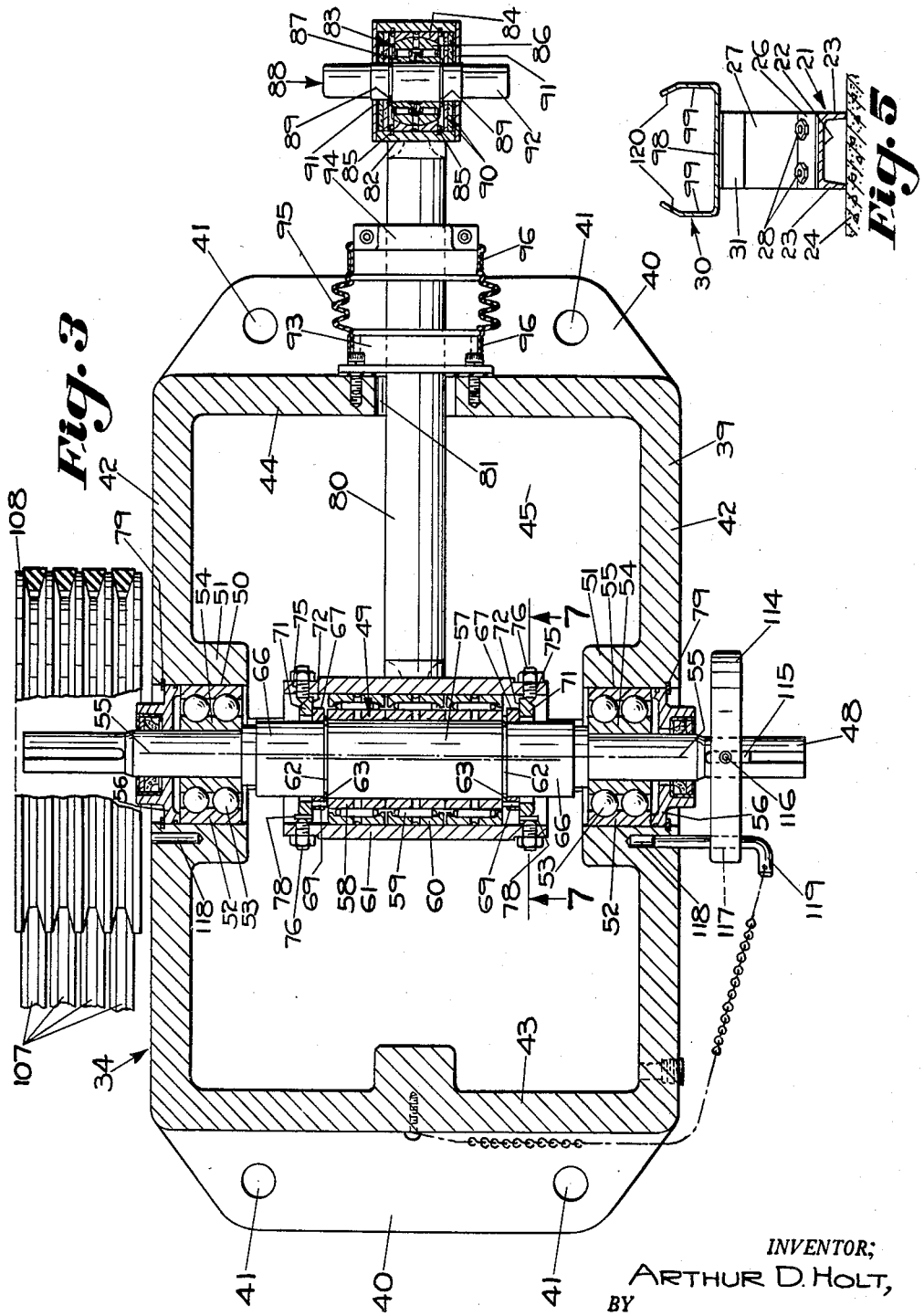
INVENTOR;
ARTHUR D. HOLT,
BY
ATT'Y.

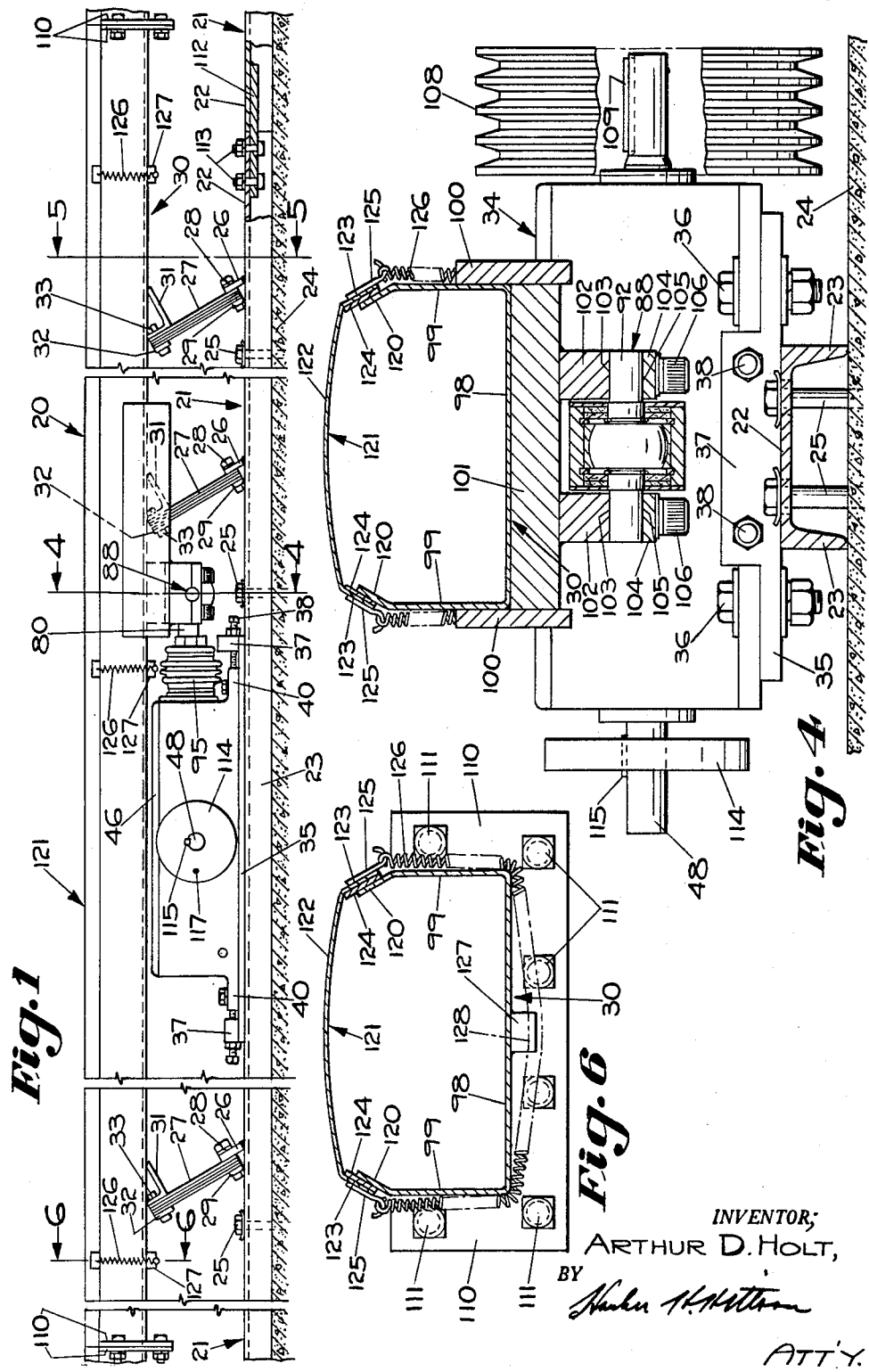

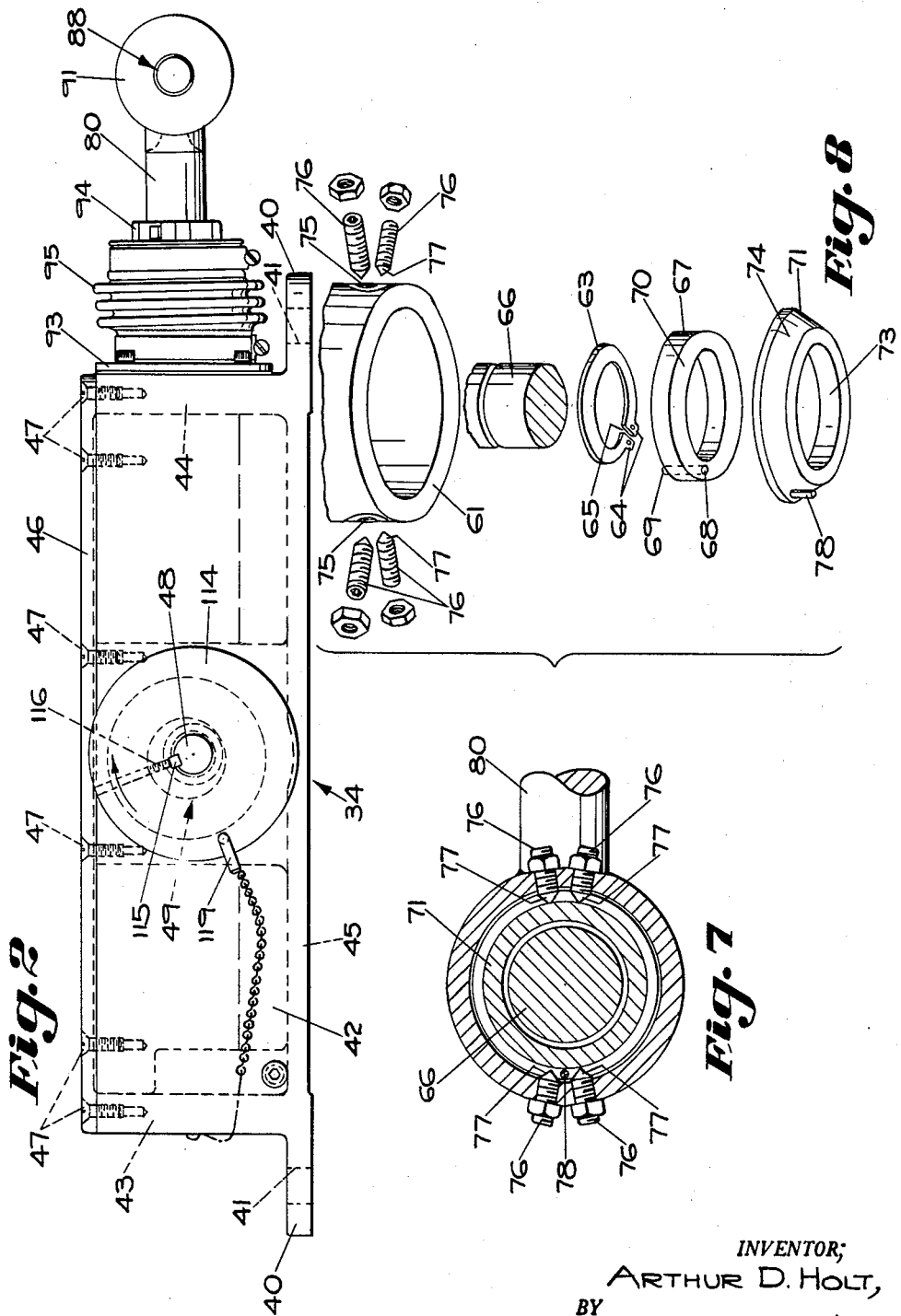

Nov. 15, 1960 — A. D. HOLT — 2,960,213
VIBRATING CONVEYOR
Filed Aug. 22, 1956 — 4 Sheets-Sheet 4

INVENTOR;
ARTHUR D. HOLT,
BY
ATTY.

United States Patent Office 2,960,213
Patented Nov. 15, 1960

2,960,213
VIBRATING CONVEYOR

Arthur D. Holt, Columbus, Ohio, assignor to The Jeffrey Manufacturing Company, a corporation of Ohio Filed Aug. 22, 1956, Ser. No. 605,613

13 Claims. (Cl. 198—220)

The instant invention relates to vibrating conveyors, and more particularly to an improved conveyor of this general type which is mechanically operated.

It is the prime object of the instant invention to provide an improved mechanical vibrating conveyor having a conveying deck supported on vibrating means, with conveyor driving means so timed as to most efficiently utilize the capacity of the vibrator means.

It is another object of the instant invention to provide an improved vibrating conveyor in which the conveying deck is supported on vibrator bars with eccentric operating means for vibrating the conveying deck on the vibrator bars, the eccentric operating means being so timed as to most efficiently utilize the elastic capacity of the vibrator bars.

It is a further object of the instant invention to provide an improved vibrating conveyor in which the conveying deck is supported by vibrator means and includes conveyor driving means so timed as to produce equal deflections of the vibrator means on opposite sides of the unstressed position thereof in the course of operating the conveying deck.

It is still another object of the instant invention to provide a vibrating conveyor having a novel mechanical power unit for driving the conveying deck.

It is still a further object of this invention to provide an improved vibrating conveyor which includes a novel mechanical power unit for driving the conveying deck, including a rotating eccentric and a connecting rod driven by the eccentric and connected to the conveyor deck, including an improved structure for attaching the connecting rod to the eccentric, which facilitates assembly and maintenance of the parts.

Still another object of the invention is to provide an improved vibrating conveyor including a conveying deck having a trough section and a novel cover means for closing the top of the conveying deck to provide a sealed conveyor.

Other objects of the invention will appear hereinafter, the novel features and combinations being set forth in the appended claims.

In the accompanying drawings:

Fig. 1 is a side view in elevation of a vibrating conveyor constructed in accordance with this invention;

Fig. 2 is a side view in elevation of the mechanical power unit for driving the vibrating conveyor of this invention;

Fig. 3 is a plan view in section of the conveyor power unit shown in Fig. 2;

Fig. 4 is an elevational view in section of the vibrating conveyor of this invention taken on the line 4—4 in Fig. 1;

Fig. 5 is an elevational view in section of the novel vibrating conveyor taken on the line 5—5 in Fig. 1;

Fig. 6 is an elevational view in section of the vibrating conveyor deck showing the means for securing the cover on the deck taken on the line 6—6 in Fig. 1;

Fig. 7 is a view in section of the eccentric in the conveyor power unit, taken on the line 7—7 in Fig. 3;

Fig. 8 is an exploded view of certain elements of the vibrating conveyor power unit.

Figure 9:
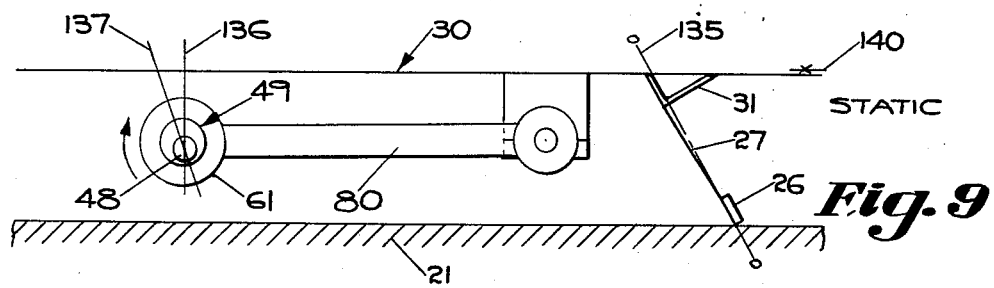
Figs. 9, 10, 11 and 12 are diagrammatic views of the vibrating conveyor deck and the driving means therefor, illustrating the mode of operation of the vibrating conveyor constructed in accordance with this invention.

This invention relates to vibrating conveyors and provides an improved vibrating conveyor of the mechanical type in which there is provided a conveying deck on which the material to be moved is received. The conveying deck is supported on vibration means, which in the illustrated embodiment of the invention comprises cantilever vibrator bars, each of which has one end secured to a fixed, rigid base or foundation and the other end of each vibrator bar is secured to the underside of the conveying deck, so that the conveying deck may be vibrated on the vibrator bars by flexure of the latter. In the vibrating conveyor of the instant invention there is provided a mechanical power unit forming part of the conveying system for driving the conveying deck. This power unit for driving the conveying deck includes a rotating eccentric which operates a connecting rod in forward and rearward strokes, the connecting rod being secured to the underside of the conveying deck and imparting to the conveying deck a forward and rearward motion, thereby causing the conveying deck to vibrate on the vibrator bars.

On the forward stroke of the connecting rod the conveying deck moves forwardly and rises as the vibrator bars are flexed in a forward direction, since the vibrator bars are initially rearwardly inclined. Accordingly, the material which is supported on the conveying deck will be impelled upwardly and forwardly by the movement of the conveying deck. At the point at which the conveying deck reaches the forward limit of its upward and forward movement, the inertia of the material on the conveying deck will cause it to continue to move forwardly and it will advance, while the conveying deck starts to move rearwardly. In this manner the material on the conveyor moves forward while the conveyor moves rearwardly, continuing in the trajectory in which the conveying deck originally carried the material. When the material falls to the conveying deck, the deck will have moved rearwardly from its forward-most position and will continue to move rearwardly until it reaches its rearmost position at which time its motion will reverse and it will again move forwardly to impel the material upwardly and forwardly to advance the material on the conveying deck. In this manner the material advances on the conveying deck in a series of steps in accordance with the forward and rearward vibratory movement of the conveying deck on the vibrator bars.

Referring to the drawings, there is illustrated in Fig. 1 a vibrating conveyor 20 constructed in accordance with this invention. The novel vibrating conveyor 20 has a base 21 formed from a longitudinally extending channel member which is inverted with the web 22 facing upwardly and the legs 23 supporting the conveyor on a foundation 24. The base 21 is secured to the foundation 24 by a plurality of bolts 25. At each of a plurality of spaced positions along the length of the conveyor base 21 there is provided a pad 26 which is formed from a plate and welded to the base 21 in an inclined position, so that each pad 26 is similarly directed towards the rear end of the conveyor, or in a direction opposite to that in which the material flows along the conveying deck 30. Each of the pads 26 forms a means for securing the lower end of a cantilever vibrator bar 27 to the base 21.

Each of the vibrator bars 27 is made up of a stack of vibrator bar elements which are secured together, although each vibrator bar may with equal advantage constitute a single element. The lower end of each vibrator bar 27 is secured to a pad 26 by a pair of bolts 28, with a clamp plate 29 holding the lower end of the vibrator bar 27 immovably against the pad 26.

Each of the vibrator bars 27 extends upwardly and rearwardly from the base 21 at the same angle as the pad 26. The upper end of each vibrator bar 27 is secured to the bottom of the conveying deck 30 by means of a pad 31, formed from an angle iron which is welded to the underside of the conveying deck 30. The face of the pad 31 is inclined at the same angle as the pad 26 so that the upper end of the vibrator bar 27 lays flush thereagainst. The upper end of the vibrator bar 27 is secured to the pad 31 by a clamp plate 32 and bolts 33 which hold the elements in assembly with the upper end of the vibrator bar 27 immovably secured to the pad 31. It will be apparent that the cantilever vibrator bars 27 form the sole supporting means for the conveying deck 30 and that as the conveying deck 30 is moved forwardly and rearwardly, it will vibrate on the vibrator bars 27, which in turn are flexed forwardly and rearwardly as a result of the forces applied to the conveying deck.

The conveying deck 30 is vibrated by a mechanical power unit 34 which is fixedly secured to the base 21. The power unit 34 is mounted on the base 21 by means of a supporting plate 35 which is welded to the top of the base 21 at approximately the desired location for the power unit 34. The power unit 34 is then secured to the supporting plate 35 in the desired position by a plurality of bolts 36, passing through a flange 40 formed at each end of the power unit 34. The supporting plate 35 includes an upstanding end bar 37 at each end thereof, in each of which are threaded a pair of adjusting bolts 38 by means of which the power unit 34 is longitudinally positioned with respect to the conveying deck 30. When the adjusting bolts 38 have been set to locate the power unit 34 in the desired position, the bolts 36 are then secured thereby fixing the power unit 34 on the conveyor base 21.

Referring to Fig. 3, in which the power unit 34 is shown in a plan sectional view, it is seen that the power unit 34 comprises a cast housing 39 formed with flanges 40, disposed one at each end thereof, which are provided with a pair of spaced holes 41 for the reception of the securing bolts 36. The power unit housing 39 includes side walls 42, a solid rear wall 43, and a front wall 44, all upstanding from a bottom wall 45 and forming a chamber within which there is provided an oil bath, in which the power unit mechanism operates. The housing 39 is closed by a cover plate 46 which is secured thereto by bolts 47 threaded into the walls of the housing 39 through the cover plate 46. There is, thereby, provided a sealed power unit which is self lubricating.

The operating element of the power unit 34 is a shaft 48, formed with an elongated eccentric 49, which is integral therewith. The opposite journal ends 55 of the shaft 48 extend through bores 50 in the side walls 42 of the housing 39. Each of the bores 50 is formed in a boss 51 that extends inwardly from the side walls 42. The outer race 52 of a ball bearing 53 is press fitted within each of the bores 50 and the inner race 54 of the ball bearing 53 is press fitted on each of the shaft journals 55 providing for rotation of the shaft 48 in the housing 39. On the outwardly facing side of each of the ball bearings 53 there is fitted a shaft seal 56, of a known form, which is secured within the bore 50 by a conventional spring retaining ring 79, thereby forming an outside seal in the bores 50.

The eccentric 49 comprises a central eccentric portion 57 on which are press fitted the inner races 58 of three needle bearings 59. The outer races 60 of the three needle bearings 59 are press fitted in the inner surface of a sleeve 61, which is thereby arranged concentrically with the eccentric 49, with the eccentric rotating relatively to the sleeve 61. The end limits of the central eccentric portion 57 are defined by annular grooves 62, formed one at each end of the central eccentric portion 57. A spring retainer ring 63 is secured in each of the annular grooves 62. The spring retainer ring 63 is of a conventional form having split ends 64, providing a space 65 between the split ends 64 (see Fig. 8). It will be understood that when the split ring 63 is placed in the annular groove 62 the ends 64 do not come together, whereby the space 65 is provided. Beyond the central eccentric portion 57, there is provided at each end thereof an outer eccentric portion 66 on which there is tightly fitted a thrust ring 67, which is located on the outer eccentric portion 66 by the spring retainer ring 63, these two elements being placed in abutting relation. The thrust ring 67 has a bore 68 extending axially thereof and in which there is secured a pin 69. The pin 69 projects axially from the thrust ring and the projecting end thereof extends into the space 65 between the split ends 64 of the spring retainer ring 63, thereby positively securing the thrust ring 67 against rotation relative to the eccentric 49. The outwardly facing surface of the thrust ring 67 is machined to form a bearing face 70. Abutting the bearing face 70 is a second thrust ring 71 the inwardly facing surface of which is machined to form a bearing face 72 which abuts and slides on the bearing face 70 of the eccentric thrust ring 67. The bore 73 of the thrust ring 71 is larger than the diameter of the eccentric 49, whereby the latter rotates freely relatively to the thrust ring 71, which is fixedly secured to the sleeve 61 as will appear hereinafter.

The sleeve thrust ring 71 is formed with a conical surface 74 which faces outwardly of the sleeve 61. The opposite ends of the sleeve 61 have threaded bores 75, two pairs of such bores 75 being provided at each end of the sleeve 61, with the bores 75 of each pair being located diametrically opposite each other. A set screw 76 is threaded into each bore 75, and the end of each set screw 76 is formed with a conical surface 77 that is adapted to mate with the conical surface 74 on the thrust ring 71. As the set screws are threaded into the bores 75 the conical ends 77 thereof will bear against the conical surface 74 on the thrust ring 71, thereby causing the bearing face 72 of the thrust ring 71 to bear against the bearing face 70 of the thrust ring 67. Through the use of the set screws 76, as herein described, the sleeve 61 is secured in assembly on the eccentric 49. The set screws 76 additionally provide a means for compensating for any wear that may occur in the system as well as initially locating the sleeve 61 relative to the eccentric 49. The thrust ring 71 has a pin 78 projecting axially from the conical surface 74 and extending between the conical ends 74 of a pair of set screws 76, whereby the thrust ring 71 is secured in fixed position relatively to the sleeve 61 and will not rotate in the sleeve 61.

A connecting rod 80 is welded to the outer surface of the sleeve 61 and extends transversely therefrom. The connecting rod 80 projects through a bore 81 in the front wall 44 of the power unit housing 39 and extends a substantial distance beyond the front wall 44. The outer end of the connecting rod 80 has welded thereto a sleeve 82 the axis of which is parallel to the axes of the eccentric 49 and the sleeve 61. A self-aligning needle bearing 83 is secured within the sleeve 82. This needle bearing 83 is formed with a two-element outer race. The outer element 84 of the outer race of the needle bearing 83 is press fitted in the bore of the sleeve 82 and is fixed therein. This outer element 84 is located within the sleeve 82 by means of spring retainer rings 85, located one at either side of the element 84. The inner bore of the element 84 is formed with a concave, spherical surface that is mated with a complementally formed convex, spherical surface on the inner element 86 of the outer race of the needle bearing 83. The inner race 87 of the needle bearing 83 is press fitted on a transversely extending pin 88 and is located thereon by a pair of spring retaining rings 89 located one at either side of the inner race 87. On either side of the self-aligning needle bearing 83 there is provided a pair of dust seals 90 which extend from the surface of the pin 88 to the inner bore of the sleeve 82. The assembly of the pin 88 in the sleeve 82 is sealed by end disks 91 which are secured in any suitable manner to the sleeve 82. The pin 88 includes stud portions 92 projecting on either side of the assembly beyond the end sealing disks 91, for a purpose to be described below.

A sealing collar 93 is secured to the front wall 44 of the housing 39, surrounding the connecting rod 80 and the bore 81 in the front wall 44. The sealing collar 93 is a thin walled element of generally cylindrical form permitting freedom of movement of the connecting rod 80 relatively thereto. A two-part sealing collar 94 is tightly secured to the connecting rod 80 at a position spaced forwardly of the sealing collar 93. The sealing collar 93 seals against the front wall around the bore 81, and the sealing collar 94 seals on the surface of the connecting rod 80. The sealing collar 93 has secured to the periphery thereof one end of a bellows type, flexible boot 95, the opposite end of the boot 95 being similarly secured to the periphery of the sealing collar 94. Straps 96 are used to tightly clamp the ends of the boot 95 to the sealing collars 93, 94. There is thereby completed a seal of the bore 81 in the front wall 44 of the housing 39, while allowing for complete freedom of movement of the connecting rod 80 relatively to the bore 81 within the necessary limits required for operation of the conveyor.

From the foregoing it will be apparent that as the shaft 48 rotates in the bearings 53, the eccentric 49 will rotate within the sleeve 61, imparting a forward and rearward movement to the connecting rod 80, which movement is transmitted to the pin 88 and through the stud portions 92 thereof to the deck 30 of the conveyor, as will appear hereinafter. The power unit 34 is preferably driven by an electric motor (not illustrated) of a selected horsepower commensurate with the load to be carried by the conveyor 20. The electric motor may be secured to the foundation 24 alongside the conveyor 20, and the power is transmitted from the electric motor to the power unit 34 by a plurality of drive belts 107 extending from the motor and entrained on the pulley 108, which is mounted on the one end of the shaft 48 and secured thereto by a key 109. The other end of the shaft 48, projecting from the side of the power unit opposite the side on which the pulley 108 is located, has mounted thereon a timing disk 114, which is secured to the shaft by a key 115 and a set screw 116. The timing disk is aligned with the eccentric 49 and a hole 117 drilled in the disk at a selected point close to the periphery of the timing disk 114, and this hole is aligned with a bore 118 formed at a selected position in the side wall 42 of the power unit 34. Thus by aligning the hole 117 in the timing disk 114 with the bore 118 in the side wall 42 of the power unit 34, the eccentric 49 may be set in a preselected position for a purpose which will be apparent below. A pin 119 is provided, and this pin may be inserted through hole 117 into bore 118 for the purpose of setting the timing disk 114 and the eccentric 49. As a matter of convenience the pin 119 is attached to the end of a chain which in turn is secured to the rear wall 40 of the housing 39, and thereby insures that the pin 119 will not be lost. The timing disk 114 may be mounted on either side of the power unit 34, depending on the side to which it is desired to transmit the power from the electric motor, and therefore a bore 118 is formed in a similar position on each side of the housing 39.

The stud portions 92 of the pin 88 serve to attach the connecting rod 80 to the conveying deck 30 of the conveyor. The conveying deck 30 has a trough section which includes a bottom wall 98 and upstanding side walls 99. A plate 100 is welded to the outside of each side wall 99 and extends forwardly from the power unit 34. Spanning the distance between the plates 100 on the underside of the conveying deck 30 is a plate 101 which is welded to the side plates 100 and to the underside of the bottom wall 98 of the conveying deck. The plates 100, 101 serve to strengthen and rigidify the portion of the conveying deck 30 to which they are welded, this being the area in which the forces are applied to the conveying deck 30 for vibrating the same on the vibrator bars 27. A pair of blocks 102 are welded to the bottom of the transversely extending plate 101 in spaced relation, and each block 102 is formed and a semi-cylindrical seat 103 for the reception of the stud portions 92 of the pin 88. A pair of caps 104, similarly formed with semi-cylindrical seats 105, are secured one to each of the blocks 102 by cap screws 106, thereby securing the stud portions 92 of the pin 88 to the underside of the conveying deck. It will be understood that the stud portions 92 of the pin 88 are fixedly secured relative to the conveying deck 30 by means of the caps 104 and that the pin 88 does not rotate relatively to the conveying deck 30.

In the operation of the illustrated vibrating conveyor an ideal condition would be for the connecting rod 80 to operate in a horizontal line. However, this condition is not maintained due to the operation of the eccentric 49 which causes the rear end of the connecting rod 80 to rise and fall, so that the rear end of the connecting rod 80 operates in an eccentric path, the useful motion of which is that in a forward and rearward direction. Similarly the forward end of the connecting rod 80 will not operate in a horizontal line due to the fact that the conveying deck 30 in vibrating on the vibrator bars 27 rises and descends so that the forward end of the connecting rod 80 will also rise and descend. Accordingly, the needle bearing 83 provides the necessary rotational freedom of movement between the forward end of the connecting rod 80 and the pin 88, and in order to relieve any twisting strains that may occur in the deck and be transmitted back to the connecting rod 80, the needle bearing 83 is formed as a self-aligning element that permits such twisting strains to be taken up in the junction of the connecting rod 80 and the conveying deck 30. It will be apparent to those skilled in the art that any such twisting strains that were transmitted back to the eccentric 49 and sleeve 61 assembly would result in damaging these elements, with such damaging effect multiplying itself and eventually making necessary the replacement of the parts. This is obviously undesirable in view of the fact that it is intended that the power unit 34 operate as a sealed unit without the necessity for regular maintenance and repair.

In the illustrated embodiment of the invention the conveyor length is built up of a plurality of conveyor sections. Only one of these sections includes the power unit 34. As sections are added to the conveyor to extend its length, the load on the power unit 34 is increased making necessary a greater power input to the power unit 34. Referring to Figs. 1 and 6, each end of a conveying deck section is formed with a flange 110 that extends laterally from the side walls 99 and the bottom wall 98 of the conveying deck. The flanges 110 on each end of the conveying deck sections are of the same configuration permitting the deck sections to be secured one to the other in longitudinal line by means of bolts 111. Each deck section also includes its own base 21, and a tongue 112 is welded to one end of the base 21 and extends in under the end of the base 21 of an adjacent conveyor section where bolt holes in the tongue 112 are aligned with bolt holes in the base 21 for the reception of bolts 113 securing the bases 21 of adjacent conveyor sections together. Each conveyor section is supported on its base 21 by an appropriate number of vibrator bars 27 in accordance with the design of the apparatus.

The vibration of the conveying deck 30 results in what may be described as a shaking of the material carried by the conveyor. With some materials which are dry and granular this action may result in a considerable amount of dust rising from the conveyor, which is objectionable for the reason that the dust can cause fouling of machine adjacent the vibrating conveyor, as well as causing discomfort to persons working in the area. Accordingly, there is provided a cover 121 for the conveying deck 30, which provides a seal across the tops of the upstanding side walls 99 of the conveying deck 30, thereby preventing the escape of any dust from the material being conveyed on the conveyor.

In the conveying deck 30, each of the upstanding side walls 99 is formed at the top thereof with an inturned edge portion 120 which forms a seat for a cover 121. The cover 121 is formed of sheet metal and includes a central arched portion 122 which spans the distance between the inturned upper edges 120 of the side walls 99. The opposite edges 123 of the cover 121 are turned downwardly to mate with the inturned edges 120 on the conveying deck 30, whereby when the cover 121 is placed on top of the conveying deck 30, the side edges 123 thereof will fit onto the inturned edges 120 of the conveying deck. Longitudinally extending sealing strips 124 are secured to the opposite edges 123 of the cover 121 on the inside surface thereof, so as to abut the outside surfaces of the inturned edges 120 on the conveying deck 30. The sealing strips 124 are made of any suitable resilient material that will be compressed when the cover 121 is placed on top of the conveying deck 30 and pulled down tightly thereon, whereby the sealing strips 124 will seal the junctions between the cover 121 and the conveying deck 30 on the opposite sides of the latter.

At each of a plurality of spaced positions along the length of the cover 121 there is provided a pair of hooks 125, located one on either side of the cover 121 in aligned position, with the hooks being welded or otherwise secured to the downwardly turned edge 123 of the cover. The hooks 125 are directed downwardly and provide the means for securing the cover to the conveying deck 30. A tension spring 126 embraces the underside of the conveying deck 30 and has its opposite ends engaged with the hooks 125, applying tension thereto to pull the cover 121 down onto the conveying deck 30 to hold it in place and to cause the aforementioned seal to be formed at the junctions between the cover 121 and the conveying deck 30. A block 127 is welded to the underside of the bottom wall 98 of the conveying deck 30 and has a transversely extending notch 128 to form a seat for the tension spring 126, providing means for holding the tension spring 126 in proper position on the conveying deck, and also making it possible to align the cover on the conveying deck 30 when it is initially placed in position.

Referring now to Figs. 9, 10, 11 and 12, the novel conveyor driving means and timing means will be described in further detail. As previously described, the conveying deck 30 is supported solely on the vibrator bars 27 which are flexible elements adapted to be flexed back and forth during the operation of the conveyor. The lower end of each of the vibrator bars 27 is fixed to a pad 26 which is secured to the base 21 of the conveyor. The upper end of each of the vibrator bars 27 is secured to a pad 31 which, in turn, is secured by welding to the underside of the bottom wall 98 of the conveying deck 30. Thus it is seen that each of the vibrator bars 27 is flexed with respect to its lower end which is fixedly secured on the base 21.

In the ideal condition of operation of the conveyor each of the vibrator bars is flexed forwardly and rearwardly an equal amount, so that the stress in the vibrator bars will be equal in opposite directions, without placing any excessive strains on the vibrator bars which would lead to their deterioration. However, in the static condition of the conveyor the vibrator bars 27 carry the load of the conveying deck 30 with the result that each of the vibrator bars 27 will be initially flexed in a rearward direction with respect to its neutral unstressed axis 135, as illustrated in Fig. 9. Starting with this condition, if the vibrator bars 27 are flexed equal amounts in forward and rearward directions either of two conditions will result. First, if the vibrator bar is flexed forwardly to its elastic limit, and then given an equal deflection to the rear of its initial position, it will be flexed in the rearward direction beyond its elastic limit, this condition resulting from the fact that the vibrator bar 27 is initially flexed rearwardly from its neutral unstressed axis 135, so that in effect the vibrator bar 27 experiences a greater deflection in the rearward direction than in the forward direction. Alternatively, if the vibrator bar is flexed in such amounts forwardly and rearwardly that the flexure thereof in a rearward direction does not exceed the elastic limit of the vibrator bar, then the flexure of the vibrator bar in a forward direction will be less than that permitted by the elastic limit of the vibrator bar and, thus, the full capacity of the vibrator bar 27 will not be utilized.

Figure 10:
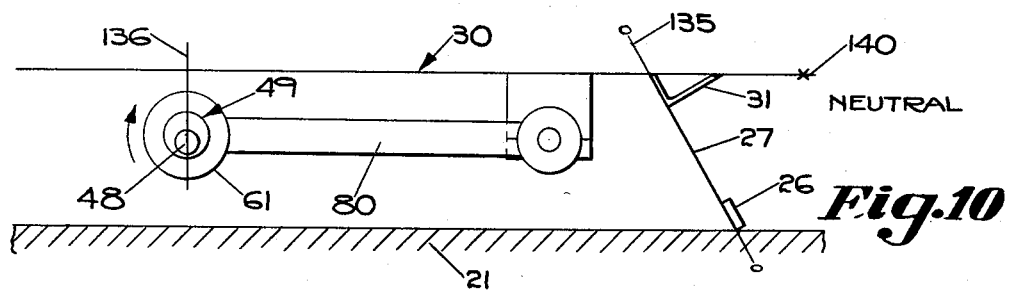
Figure 11:
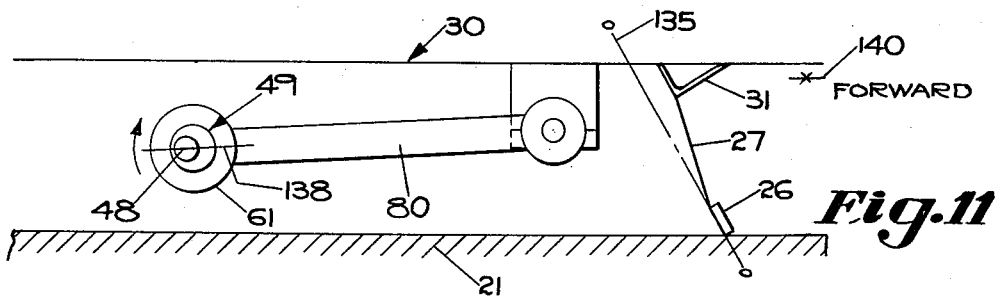
Figure 12:
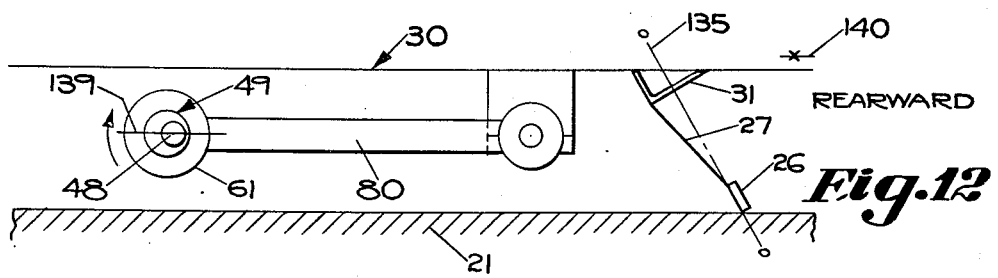

In accordance with the instant invention the conveyor driving means is so associated with the conveying deck and the vibrator bars 27 as to produce an equal and opposite flexure of the vibrator bars 27 to the extent that the full capacity of the vibrator bars may be utilized in operating the conveyor, to provide the maximum efficiency thereof. Fig. 9 illustrates diagrammatically the static condition of the conveying deck 30, wherein the static load of the conveying deck 30 produces a rearward flexure of the vibrator bar 27. The eccentric 49, which is the essential driving element for the conveying deck 30, is accordingly set back from its vertical position 136 to the axis 137. The vertical position 136 of the eccentric 49 corresponds to a position of zero throw of the connecting rod 80 wherein each of the vibrator bars 27 is in its neutral unstressed position as shown in Fig. 10, wherein the vibrator bar 27 is aligned with the neutral unstressed axis 135. Accordingly, as the eccentric 49 rotates from its initial position at axis 137 to the vertical position 136, the vibrator bar 27 will be restored to its neutral unstressed axis 135, as shown in Fig. 10.

As the rotation of the eccentric 49 continues in a clockwise direction through an angle of approximately 90° the eccentric 49 reaches a position 138 of maximum forward throw of the connecting rod 80 in which the vibrator bar 27 reaches its maximum flexure in a forward direction. This flexure of the vibrator bar 27 may be measured from the neutral unstressed axis 135, since the initial setting of the eccentric 49, as illustrated in Fig. 9, has compensated for the static rearward deflection of the vibrator bar 27. As the rotation of the eccentric 49 continues it will again reach a position of zero throw of the connecting rod 80 corresponding to a second neutral position, similar to that illustrated in Fig. 10, in which the eccentric has rotated approximately 180° from its vertical position 136. Again the vibrator bar 27 will coincide with the neutral unstressed axis 135.

A further rotation of the eccentric 49 in a clockwise direction through an angle of about 90° brings the eccentric 49 to a rearwardly directed position 139 which produces a maximum rearward throw of the connecting rod 80, and a maximum rearward flexure of the vibrator bar 27. It will be seen that during these operations the conveying deck 30 rises and descends with relation to its neutral position, as is apparent from comparison of the conveying deck position relative to the neutral plane 140 in Figs. 9 to 12. From the foregoing it will be apparent that there is produced a substantially equal flexure of the vibrator bar 27 in forward and rearward directions by the operation of the eccentric 49. To further idealize the system, it would be desirable to have the connecting rod 80 working at all times in a horizontal line. However, each end of the connecting rod 80, the one end which is secured to the eccentric 49, and the other end which is secured to the conveying deck 30, operate in eccentric paths, the one due to the travel of the eccentric and the other due to the rise and descent of the conveying deck 30. In order to compensate somewhat for the eccentricity of the opposite ends of the connecting rod 80, it is made relatively long. Accordingly, the position of the eccentric in which the vibrator bar 27 will coincide with its neutral unstressed axis 135 will not be exactly vertical but may vary slightly therefrom. Also, the positions of maximum throw of the connecting rod in forward and rearward directions, producing the desired equal maximum flexures of the vibrator bar 27 in opposite directions, may not occur at exactly the horizontal positions of the eccentric, but will be slightly displaced therefrom. These last mentioned characteristics are related to the dimensioning of the system.

The timing disk 114 is secured to the end of the shaft 48 which projects beyond the housing 39, and provides means for setting up the power unit 34 with the eccentric 49 in the desired offset position, as illustrated in Fig. 9, to achieve the optimum operation of the conveying deck in accordance with the teachings of this invention, wherein the flexure of the vibrator bar 27 is equal in forward and rearward directions, on opposite sides of its neutral unstressed axis 135. Thus in setting up the machine the pin 119 is inserted through the hole 117 in the timing disk 114 and into the bore 118 formed in the side wall 42 of the housing 39. This sets the position of the eccentric 49 in accordance with the flexure of the vibrator bars 27 due to the static load of the conveying deck 30. Then the stud portions 92 of the pin 82 are secured to the underside of the conveying deck 30 with the caps 104. When this procedure has been completed the power unit 34 is secured in place with the bolts 36. The pin 119 is then removed from the timing disk 114 and the conveyor 20 may then be operated. As a result of setting the timing disk 114 and the initial position of the eccentric 49 to correspond to the flexure of the vibrator bars 27 under the static load carried thereby, the operation of the eccentric 49 is timed to produce substantially equal and opposite deflections of the vibrator bars 27, as described hereinabove.

The conveyor, constructed in accordance with the teachings of the instant invention, is a light weight unit which is extremely efficient and rugged, notwithstanding its light weight. In accordance with the instant invention the power unit of the improved conveyor is so constructed and associated with the conveying deck and the vibrator bars, that the forces applied to the conveying deck are most efficiently utilized to provide a conveyor that is exceptionally smooth in its operation, so that the wear on the elements constituting the conveyor is reduced to the extent that almost no maintenance is required on this conveyor. It is material to these features of the conveyor that the conveying deck be operated in such manner that the vibrator bars are flexed an equal extent in forward and rearward directions with respect to the neutral unstressed axis of the vibrator bars, and in accordance with the invention the conveyor operating means is so combined with the conveying deck and the vibrator bars that this objective is achieved.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A vibrating conveyor having a conveying deck, vibrator means supporting the deck, means connected to the deck for vibrating the deck on the vibrator means, the static load on the vibrator means deflecting the vibrator means from its unstressed position, means for operating said vibrating means to produce forward and rearward deflection of the vibrator means, and means for regulation of the operative positions of the vibrating means producing maximum forward and rearward deflection of the vibrator means to produce substantially equal and opposite deflections of the vibrator means from its unstressed position.

2. A vibrating conveyor having a conveying deck, vibrator means supporting the deck, means for vibrating the conveying deck comprising eccentric means connected to the deck for vibrating the deck on the vibrator means, the static load on the vibrator means deflecting the vibrator means from its unstressed position, means for operating said eccentric means to produce forward and rearward deflection of the vibrator means, and means for regulation of the operative positions of the eccentric means producing maximum forward and rearward deflection of the vibrator means to produce substantially equal and opposite deflections of the vibrator means from its unstressed position.

3. A vibrating conveyor having a conveying deck, vibrator bars supporting the deck, means for vibrating the conveying deck comprising an eccentric and a connecting rod operated by the eccentric in forward and rearward strokes, said connecting rod being connected to the conveying deck and driving the conveyor by vibrating the conveying deck on the vibrator bars, the static load on the vibrator bars deflecting them from their unstressed neutral positions, means for rotating the eccentric, and means for regulation of the rotational positions of the eccentric which produce maximum strokes of the connecting rod in forward and rearward directions to produce substantially equal and opposite deflections of each vibrator bar from its unstressed neutral position.

4. A vibrating conveyor having a conveying deck, vibrator bars supporting the deck, means for vibrating the conveying deck comprising an eccentric and a connecting rod operated by the eccentric in forward and rearward strokes, said connecting rod being connected to the conveying deck and driving the conveyor by vibrating the conveying deck on the vibrator bars, the static load on the vibrator bars deflecting them from their unstressed neutral positions, means for rotating the eccentric, a regulation disk connected to the eccentric for regulation of the rotational positions of the eccentric which produce maximum strokes of the connecting rod in forward and rearward directions to produce substantially equal and opposite deflections of each vibrator bar from its unstressed neutral position.

5. A vibrating conveyor having a conveying deck, vibrator bars supporting the deck, means for vibrating the conveying deck comprising an eccentric and a connecting rod operated by the eccentric in forward and rearward strokes, a universal and rotatable bearing means securing the connecting rod to the conveying deck to transmit the forward and rearward reciprocation of the connecting rod to the conveying deck longitudinally thereof to drive the conveyor by vibrating the conveying deck on the vibrator bars, the static load on the vibrator bars deflecting them from their unstressed neutral positions, means for rotating the eccentric, a regulation disk connected to the eccentric for regulation of the rotational positions of the eccentric which produce maximum strokes of the connecting rod in forward and rearward directions to produce substantially equal and opposite deflections of each vibrator bar from its unstressed neutral position.

6. A vibrating conveyor having a conveying deck, cantilever vibrator bars supporting the deck, each of said vibrator bars being inclined and the static load of the conveying deck deflecting each of said vibrator bars from its unstressed neutral positions, means for vibrating the conveying deck comprising an eccentric and a connecting rod operated by the eccentric in forward and rearward strokes, said connecting rod being connected to the conveying deck and driving the conveyor by vibrating the conveying deck on the vibrator bars, means for rotating the eccentric, and means for regulation of the rotational positions of the eccentric which produce maximum strokes of the connecting rod in forward and rearward directions to produce substantially equal and opposite deflections of each vibrator bar from its unstressed neutral position.

7. A vibrating conveyor having a conveying deck, cantilever vibrator bars supporting the deck, each of said vibrator bars being inclined and the static load of the conveying deck deflecting each of said vibrator bars from its unstressed neutral position, means for vibrating the conveying deck comprising an eccentric and a connecting rod operated by the eccentric in forward and rearward strokes, said connecting rod being connected to the conveying deck and driving the conveyor by vibrating the conveying deck on the vibrator bars, means for rotating the eccentric, a regulation disk connected to the eccentric for regulation of the rotational positions of the eccentric which produces maximum strokes of the connecting rod in forward and rearward directions to produce substantially equal and opposite deflections of each vibrator bar from its unstressed neutral position.

8. A vibrating conveyor having a conveying deck, cantilever vibrator bars supporting the deck, each of said vibrator bars being inclined and the static load of the conveying deck deflecting each of said vibrator bars from its unstressed neutral position, means for vibrating the conveying deck comprising an eccentric and a connecting rod operated by the eccentric in forward and rearward strokes, a universal and rotatable bearing connecting the connecting rod to the conveying deck to transmit a thrust to the conveying deck longitudinally thereof, said connecting rod driving the conveyor by vibrating the conveying deck on the vibrator bars, means for rotating the eccentric, and means for regulation of the rotational positions of the eccentric which produce maximum strokes of the connecting rod in forward and rearward directions to produce substantially equal and opposite deflections of each vibrator bar from its unstressed neutral position.

9. A vibrating conveyor comprising a conveying deck supported on cantilever vibrator bars, means for imparting a forward and rearward motion to the conveying deck to vibrate the deck on the vibrator bars comprising a power unit having an elongated rotating eccentric, a sleeve coextensive with the eccentric and mounted on the eccentric with the eccentric rotating relatively to the sleeve, a thrust ring disposed in each end of the sleeve for retaining the sleeve in axial alignment with the eccentric, thrust rings disposed on the eccentric one adjacent each thrust ring in the sleeve and cooperating with the thrust rings in the sleeve to fix the position of the sleeve on the eccentric, the thrust rings in the sleeve being rotatively fixedly secured in the sleeve and the eccentric thrust rings rotating with the eccentric, the adjacent surfaces of the sleeve thrust rings and the eccentric thrust rings being formed with bearing faces and bearing against each other, radially extending adjustable means in the sleeve engaging the sleeve thrust rings for securing the sleeve in assembly on the eccentric, a connecting rod extending transversely of the sleeve, means securing the connecting rod to the conveying deck to transmit the forward and rearward reciprocation of the connecting rod to the conveying deck.

10. A vibrating conveyor comprising a conveying deck supported on cantilever vibrator bars, each of said vibrator bars being deflected from its unstressed neutral position by the static weight of the conveying deck, means for imparting a forward and rearward motion to the conveying deck to vibrate the deck on the vibrator bars comprising a power unit having an elongated rotating eccentric, a sleeve coextensive with the eccentric and mounted on the eccentric with the eccentric rotating relatively to the sleeve, a thrust ring disposed in each end of the sleeve for retaining the sleeve in axial alignment with the eccentric, thrust rings disposed on the eccentric one adjacent each thrust ring in the sleeve and cooperating with the thrust rings in the sleeve to fix the position of the sleeve on the eccentric, the thrust rings in the sleeve being rotatively fixedly secured in the sleeve and the eccentric thrust rings rotating with the eccentric, the adjacent surfaces of the sleeve thrust rings and the eccentric thrust rings being formed with bearing faces and bearing on each other, radially extending adjustable means in the sleeve engaging the sleeve thrust rings for securing the sleeve in assembly on the eccentric, a connecting rod extending transversely of the sleeve, means securing the connecting rod to the conveying deck to transmit the forward and rearward reciprocation of the connecting rod to the conveying deck, means for rotating the eccentric and means for regulation of the rotational positions of the eccentric which produce maximum strokes of the connecting rod in forward and rearward directions to produce substantially equal and opposite deflections of each vibrator bar from its unstressed neutral position.

11. A vibrating conveyor comprising a conveyor deck supported on cantilever vibrator bars, means for imparting a forward and rearward motion to the conveying deck to vibrate the deck on the vibrator bars comprising a power unit having an elongated rotating eccentric, a sleeve coextensive with the eccentric and mounted on the eccentric with the eccentric rotating relatively to the sleeve, a thrust ring disposed in each end of the sleeve for retaining the sleeve in axial alignment with the eccentric, thrust rings disposed on the eccentric one adjacent each thrust ring in the sleeve and cooperating with the thrust rings in the sleeve to fix the position of the sleeve on the eccentric, the thrust rings in the sleeve being rotatively fixedly secured in the sleeve and the eccentric thrust rings rotating with the eccentric, the adjacent surfaces of the sleeve thrust rings and the eccentric thrust rings being formed with bearing faces and bearing on each other, the thrust rings in the sleeve being adjustable to position the sleeve on the eccentric, said sleeve thrust rings including a radially inclined peripheral surface, radially extending adjustable means in the sleeve engaging the radially inclined peripheral surface of the sleeve thrust rings for securing the sleeve in assembly on the eccentric, a connecting rod extending transversely of the sleeve, means securing the connecting rod to the conveying deck to transmit the forward and rearward reciprocation of the connecting rod to the conveying deck.

12. A vibrating conveyor comprising a conveying deck supported on cantilever vibrator bars, means for imparting a forward and rearward motion to the conveying deck to vibrate the deck on the vibrator bars comprising a power unit having an elongated rotating eccentric, a sleeve coextensive with the eccentric and mounted on the eccentric with the eccentric rotating relatively to the sleeve, a thrust ring disposed in each end of the sleeve for retaining the sleeve in axial alignment with the eccentric, thrust rings disposed on the eccentric one adjacent each thrust ring in the sleeve and cooperating with the thrust rings in the sleeve to fix the position of the sleeve on the eccentric, the thrust rings in the sleeve being rotatively fixedly secured in the sleeve and the eccentric thrust rings rotating with the eccentric, the adjacent surfaces of the sleeve thrust rings and the eccentric thrust rings being formed with bearing faces and bearing on each other, radially extending adjustable means in the sleeve engaging the sleeve thrust rings for securing the sleeve in assembly on the eccentric, a connecting rod extending transversely of the sleeve, a universal and rotatable bearing means securing the connecting rod to the conveying deck to transmit the forward and rearward reciprocation of the connecting rod to the conveying deck longitudinally thereof.

13. A vibrating conveyor having a conveying deck supported on cantilever vibrator bars, the static load on the vibrator bars deflecting them from their unstressed neutral positions, means for imparting a forward and rearward motion to the conveying deck to vibrate the deck on the vibrator bars comprising a power unit having a rotating eccentric, a sleeve mounted on the eccentric with the eccentric rotating relatively to the sleeve, cooperating means disposed on the eccentric and in the sleeve, respectively, for maintaining the sleeve and the eccentric in axial alignment, with the axes of the sleeve and the eccentric parallel to each other, a connecting rod extending transversely of the sleeve, means securing the connecting rod to the conveying deck to transmit the forward and rearward reciprocation of the connecting rod to the conveying deck, means for rotating the eccentric, a regulation disk connected to the eccentric for regulation of the rotational positions of the eccentric which produce maximum strokes of the connecting rod in forward and rearward directions to produce substantially equal and opposite deflections of each vibrator bar from its unstressed neutral position.

References Cited in the file of this patent

UNITED STATES PATENTS

| | | |
|---|---|---|
| 1,868,817 | Dunham | July 26, 1932 |
| 2,038,471 | Benatar | Apr. 21, 1936 |
| 2,113,451 | Leland | Apr. 5, 1938 |
| 2,279,742 | Overstrom et al. | Apr. 14, 1942 |
| 2,409,994 | Toohey | Oct. 22, 1946 |
| 2,465,145 | Brainerd | Mar. 22, 1949 |
| 2,638,206 | Musschoot et al. | May 12, 1953 |
| 2,642,980 | Soucek | June 23, 1953 |
| 2,669,344 | Flint | Feb. 16, 1954 |
| 2,776,741 | Carrier | Jan. 8, 1957 |